United States Patent
Galt et al.

(10) Patent No.: US 6,241,509 B1
(45) Date of Patent: Jun. 5, 2001

(54) TIEBAR STRUCTURE FOR INJECTION MOLDING MACHINE

(75) Inventors: John Galt, Nobleton; Frank E. Goetz, Cambridge; Ronald Ing, Etobicoke; William James Jacovich, Newmarket; Martin Richard Kestle, Everett, all of (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/615,349

(22) Filed: Jul. 12, 2000

Related U.S. Application Data (63) Continuation of application No. 09/070,598, filed on Apr. 30, 1998, now abandoned.

(51) Int. Cl.[7] .................................................. B29C 45/00
(52) U.S. Cl. .......................... 425/576; 425/589; 425/595
(58) Field of Search .................................. 425/183, 576, 425/589, 595, 450.1, 451.9

(56) References Cited

U.S. PATENT DOCUMENTS

| | | | |
|---|---|---|---|
| 2,739,349 | * 3/1956 | Strauss. | |
| 3,093,863 | * 6/1963 | Ehlert | 425/451.7 |
| 4,330,257 | * 5/1982 | Rees et al. | 425/589 |
| 4,836,767 | * 6/1989 | Schad et al. | 425/576 |
| 5,336,462 | 8/1994 | Wohlrab | 264/328.1 |
| 5,728,409 | * 3/1998 | Schad et al. | 425/130 |
| 5,753,153 | * 5/1998 | Choi | 425/595 |
| 5,772,951 | * 6/1998 | Coxhead et al. | 425/534 |
| 5,817,345 | * 10/1998 | Koch et al. | 425/576 |
| 5,837,301 | * 11/1998 | Arnott et al. | 425/589 |

FOREIGN PATENT DOCUMENTS

| | | |
|---|---|---|
| 58-81141 | * 5/1983 | (JP). |
| 62-60618 | * 5/1983 | (JP). |
| 5-169454 | * 7/1993 | (JP). |

* cited by examiner

*Primary Examiner*—James P. Mackey
(74) *Attorney, Agent, or Firm*—Bachman & LaPointe, P.C.

(57) ABSTRACT

Construction includes a stationary platen and a movable platen movable with respect to the stationary platen from a closed position in clamping engagement with the stationary platen to an open position spaced from the stationary platen. At least two tiebars are provided connecting the stationary platen to the movable platen, and a stroke cylinder within each tiebar operative to move the platens from an open to closed position and from a closed to open position. Clamping means are provided to clamp the platens together in the closed position, and including means carried by the tiebars to engage the clamping means.

30 Claims, 8 Drawing Sheets

TIEBAR STRUCTURE FOR INJECTION MOLDING MACHINE

This is a Continuation, of application Ser. No. 09/070,598, filed Apr. 30, 1998, now abandoned

BACKGROUND OF THE INVENTION

The present invention relates to a novel and improved tiebar construction for an injection molding machine and an improved injection molding machine.

Tiebars are conventionally used in injection molding machines as shown in U.S. Pat. No. 2,739,349. See also U.S. Pat. No. 5,728,409 and U.S. patent application Ser. No. 08/582,434, filed Jan. 2, 1996, and U.S. patent application Ser. No. 08/847,895, filed Apr. 28, 1997, the disclosures of which are incorporated herein by reference. A four tiebar configuration with separate stroke cylinders is conventionally employed.

It is highly desirable to reduce the number of parts in an injection molding machine and hence the overall cost and complexity of such machines. It is also desirable to enable the more efficient use of space and provide for a simplified operation. It is also desirable to accomplish the foregoing while minimizing if not eliminating the risk of deflection which is prevalent in conventional constructions.

Accordingly, it is the principal object of the present invention to provide an improved tiebar construction for an injection molding machine, and an improved injection molding machine.

It is a still further object of the present invention to provide improved constructions as aforesaid which minimizes the number of parts and reduces cost and complexity of the overall structure.

It is a further object of the present invention to provide improvements as aforesaid which provides for a simplified operation and enables a more efficient use of space.

It is an additional objective of the present invention to provide improvements as aforesaid while minimizing if not eliminating the risk of deflection in the injection molding apparatus.

Further objects and advantages of the present invention will appear hereinbelow.

SUMMARY OF THE INVENTION

In accordance with the present invention, the foregoing objects and advantages are readily obtained.

In accordance with the present invention, a novel tiebar construction is provided for an injection molding machine, comprising: a stationary platen; a movable platen movable with respect to the stationary platen from a closed position in clamping engagement with the stationary platen to an open position spaced from the stationary platen; at least two tiebars connecting the stationary platen to the movable platen; a stroke cylinder within at least two of said tiebars operative to move the platens from an open to closed position and from a closed to open position; releasable clamping means to clamp the platens together in the closed position; and means carried by at least two tiebars to engage the clamping means. The present invention also provides a process for clamping platens together in an injection molding machine using a tiebar construction.

The present invention also includes an improved injection molding machine and process, comprising: a stationary platen; a rotatable turret means movable with respect to the stationary platen from a closed position in clamping engagement with the stationary platen to an open position spaced from the stationary platen; two tiebars connecting the stationary platen to the rotatable turret means; means to clamp the stationary platen to the rotatable turret means; and means to separate the stationary platen from the rotatable turret means.

Further features of the present invention will appear hereinbelow.

BRIEF DESCRIPTION OF THE DRAWINGS

The present invention will be more readily understood from a consideration of the accompanying illustrative drawings, in which.

DETAILED DESCRIPTION OF PREFERRED EMBODIMENTS

The present invention includes a novel and advantageous tiebar construction and process in which the tiebar contains a stroke cylinder inside the tiebar and also a means to engage a clamp means. The present invention also includes a process and an injection molding machine which is an index machine and which contains only two tiebars. This represents a low cost option for low tonnage machines where the turret block is comparatively small and the clamping forces can be applied directly to the pinion centerline.

Figure 1:
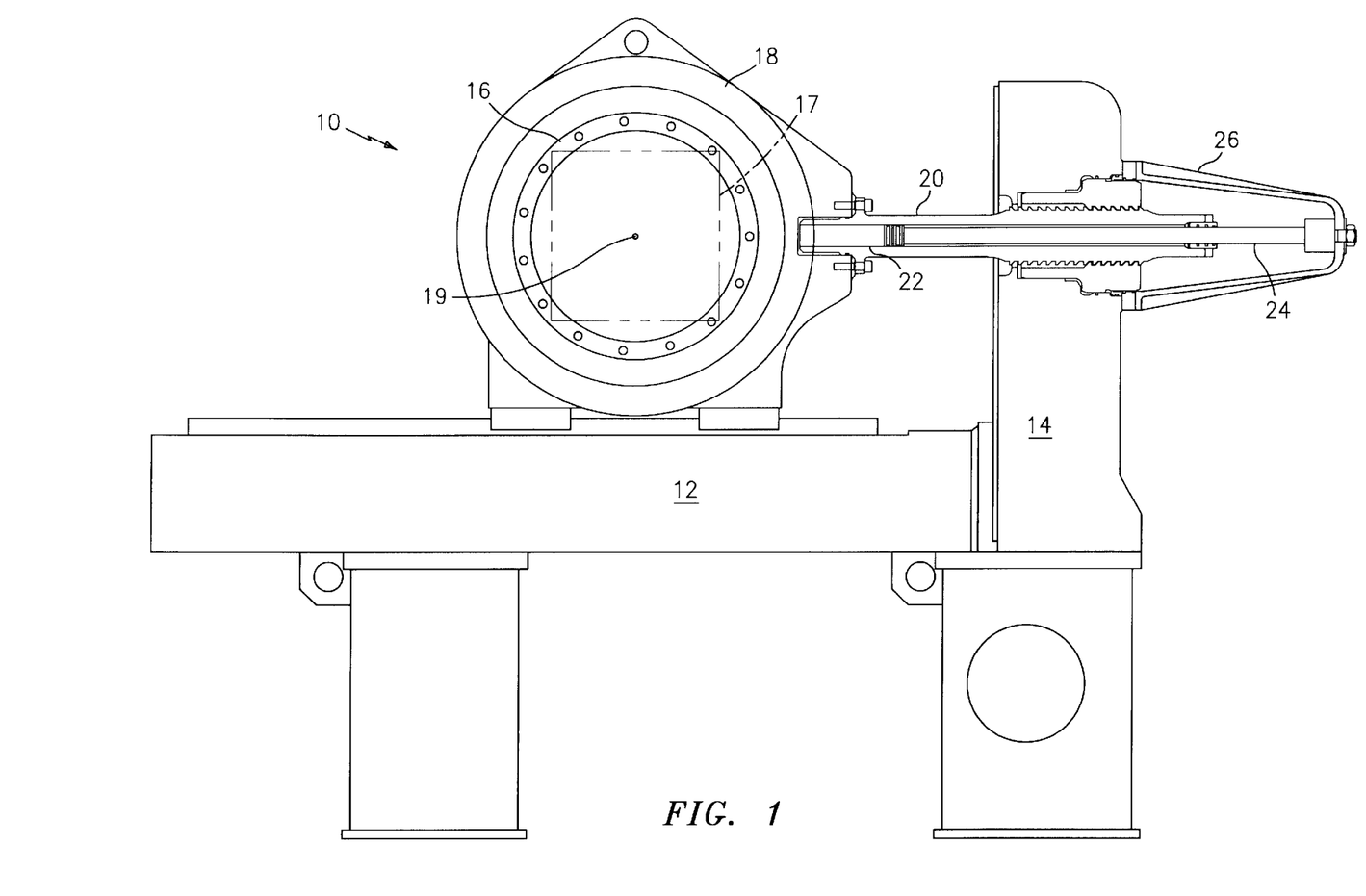
FIG. 1 is a side elevational view of one embodiment of the present invention showing a horizontal clamp arrangement.
Figure 2:
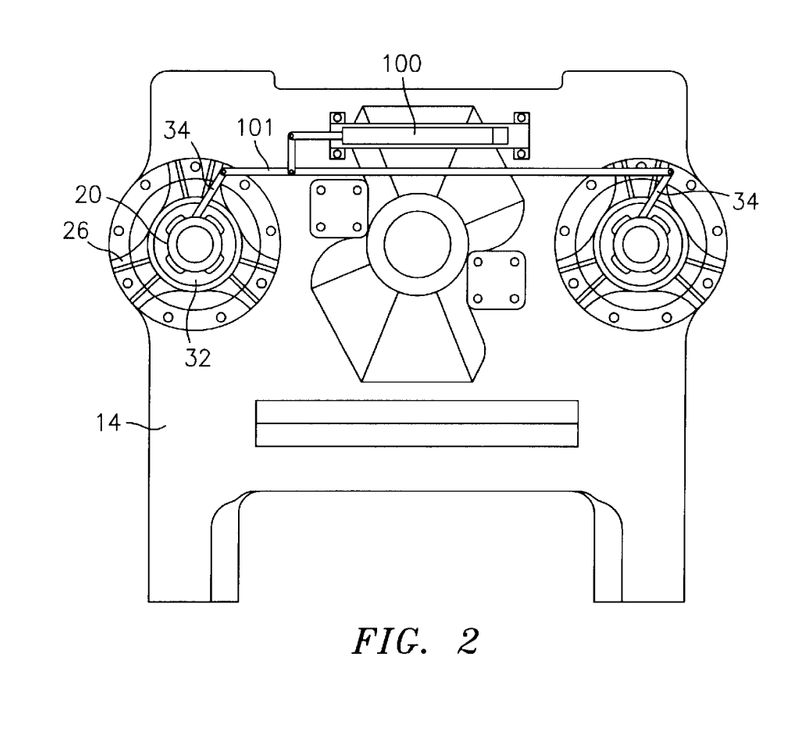
FIG. 2 is an end elevational view of the embodiment of FIG. 1.

Referring to FIGS. 1–2, an index machine 10 is shown including a base 12, a stationary platen 14 and a movable platen 16 which is movable with respect to the stationary platen 14. The movable platen 16 is a four-faced turret block 17, which is positioned within the movable platen with pinions in bearings mounted in carriers 18 that slide on base 12 of the type described in the aforementioned U.S. Pat. No. 5,728,409. The turret block or movable platen 16 is rotated or indexed on a central axis 19 so that the faces thereof represent up to four sequential positions in an injection molding cycle, as for example, an injection cycle, two cooling cycles and an ejection cycle, as is shown in the above-identified U.S. Pat. No. 5,728,409, or for example two opposed faces only could be used as shown in copending U.S. patent application Ser. No. 847,895, filed Apr. 28, 1997. Thus, the rotatable turret means may be rotatable on a central axis of rotation for rotating a plurality of movable mold halves thereof into alignment with a first mold half carried by the stationary platen. Each of the movable mold halves include one of at least one mold cavity and at least one mold core matable with the first mold half for forming a mold for molding a molded article, with the mold halves being clamped together as will be described hereinbelow.

Two tiebars 20 are provided bolted to carriers 18, each of which include an inside stroke cylinder 22, the rod 24 of which is fixed to housing 26 which in turn is bolted to stationary platen 14.

Figure 4:
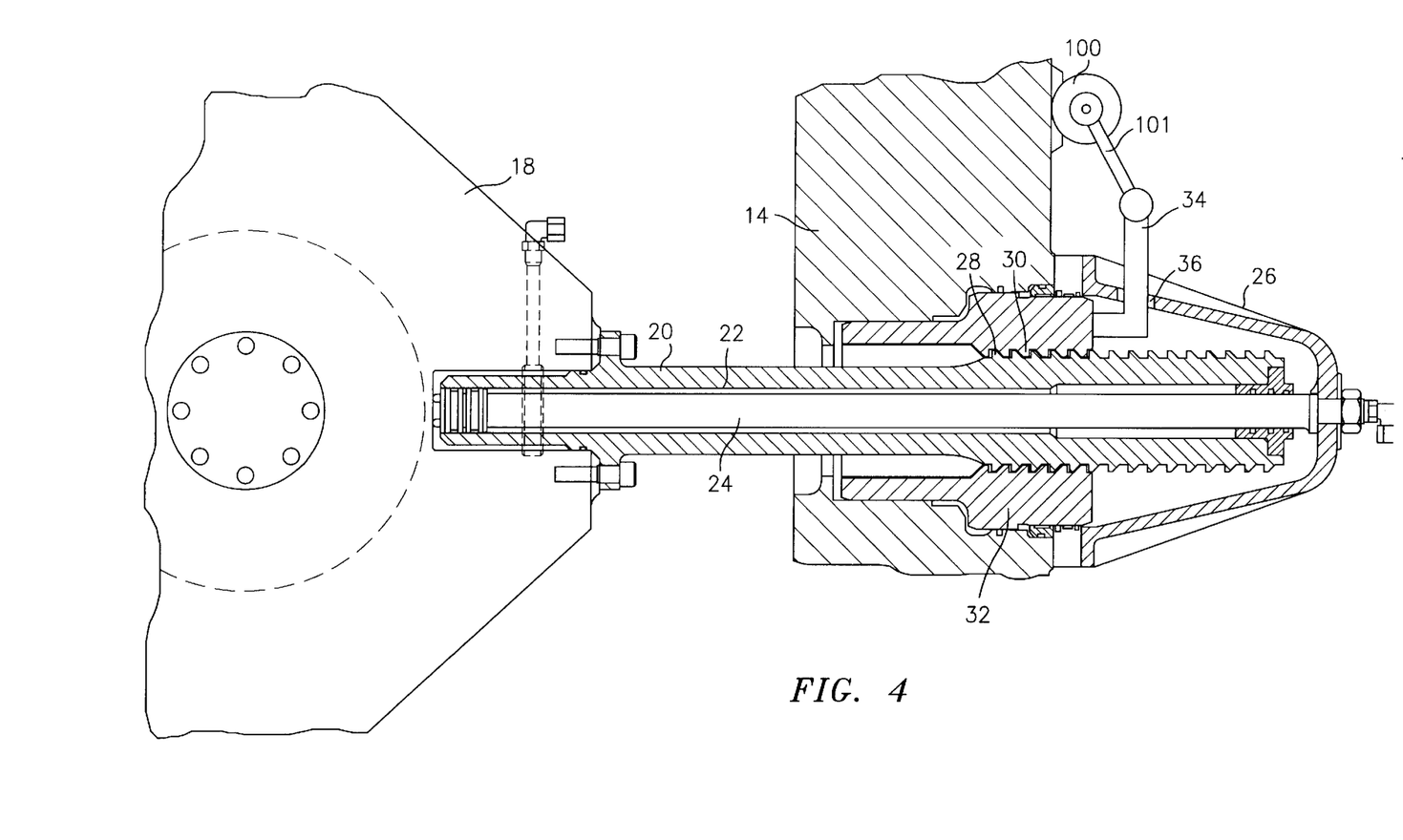
FIG. 4 is an enlarged side elevational view of the embodiment of FIG. 1 at minimum shutheight.
Figure 5:
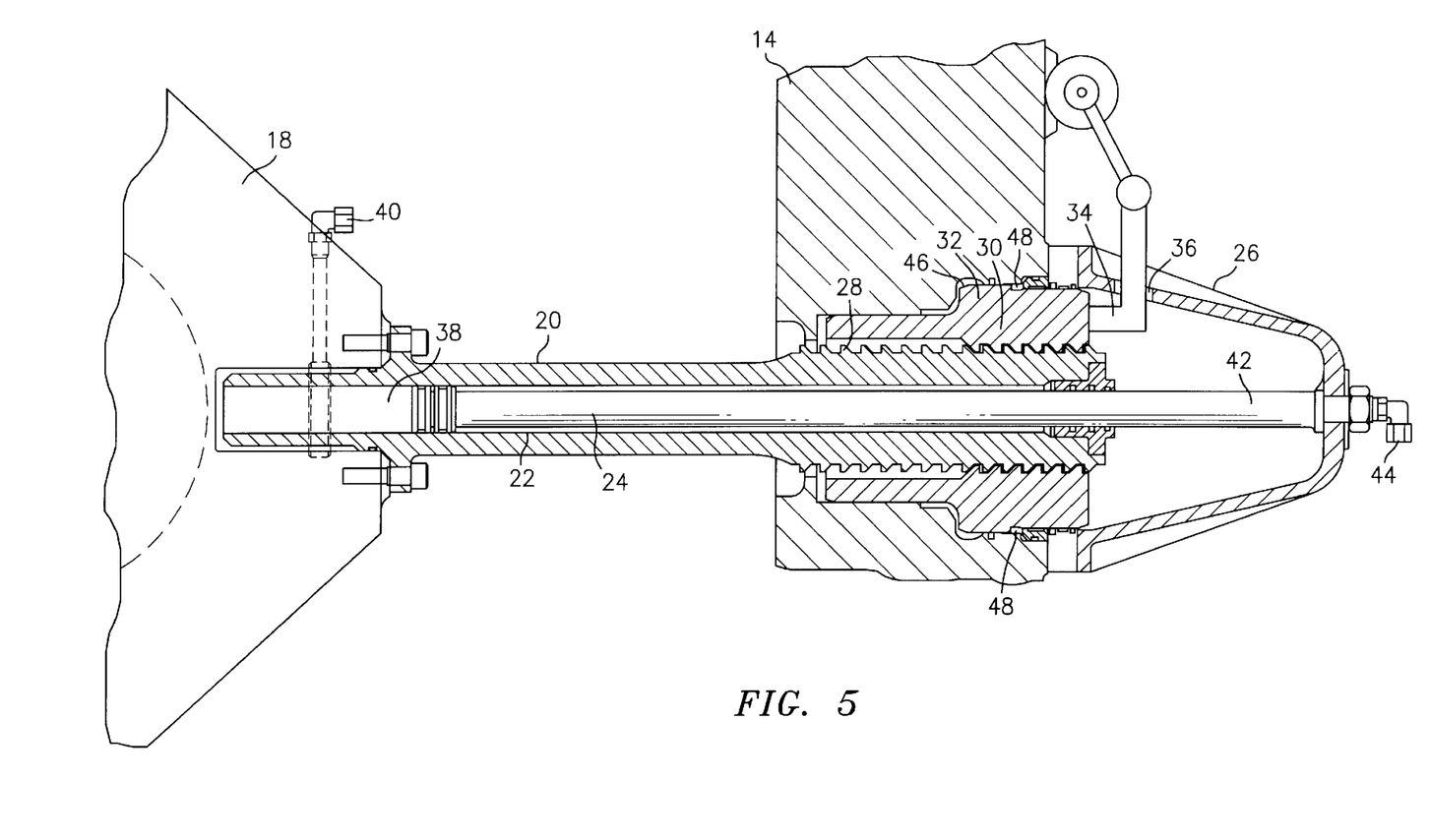
FIG. 5 is an enlarged side elevational view similar to FIG. 4 at maximum shutheight.

Referring to the detailed view of FIG. 5, each tiebar 20 includes external teeth 28 that are engageable with corresponding internal teeth 30 of rotating clamp piston 32, with the clamp piston contained in stationary platen 14. The clamp piston includes a row of teeth and an adjacent row free from teeth so that on rotation of the clamp piston the clamp piston teeth alternately engage and disengage the tiebar teeth. Clamp piston 32 may be rotated by any desired and convenient means, such as a cylinder means acting on pin 34 via slot 36 in housing 26, such as cylinder 100 bolted to the stationary platen with linkage means 101 connecting pins 34 together and causing rotation of pistons 32, as shown in FIGS. 2 and 4.

Figure 6:
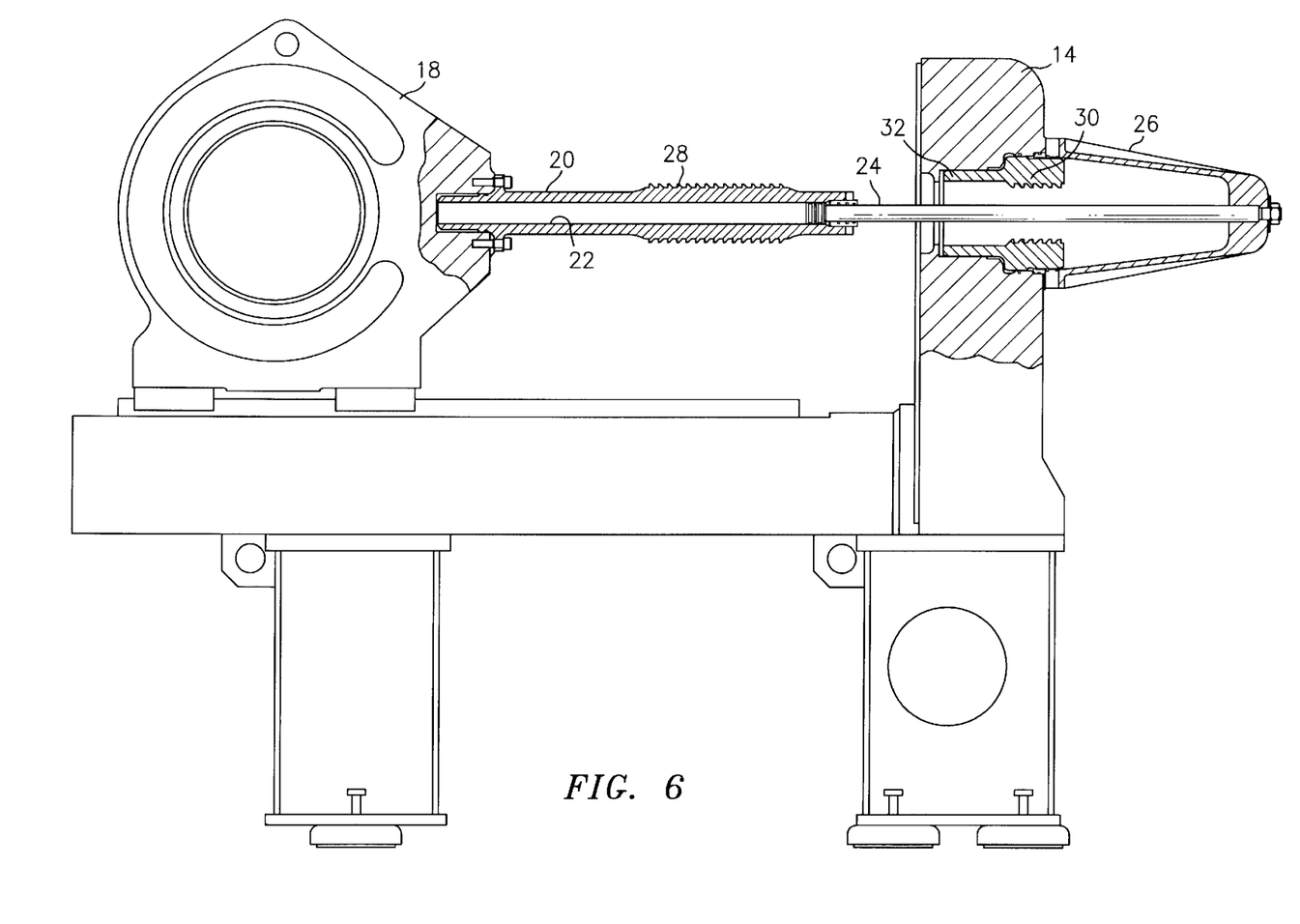
FIG. 6 is a side elevational view of the embodiment of FIG. 1 at maximum daylight or mold open stroke.

FIG. 4 shows how carriers 18 can be positioned closer to stationary platen 14 to accommodate molds having smaller shutheights. Tiebar teeth 28 on tiebars 20 can be extended as shown in FIG. 4 in order to provide a range of shutheights such that the corresponding clamp piston teeth 30 can engage tiebars 20 along the full extent of the available shutheights. FIGS. 4 and 5 show the clamp in the closed position; whereas, FIG. 6 shows the clamp in the full open or maximum daylight position.

In operation, with particular reference to FIG. 5, pin 34 rotates clamp piston 32 so that clamp piston teeth 30 are disengaged from teeth 28 on tiebars 20. High pressure oil is then supplied to the piston end 38 of stroke cylinder 22 via line 40 causing stroke cylinder rod 24 to extend as shown in FIG. 6 and move carriers 18 and turret block 16 away from the stationary platen 14, thereby opening the mold. In order to close the mold, oil is supplied to the rod side 42 of stroke cylinder 22 via line 44, thereby retracting stroke cylinder rod 24 and closing the clamp until the mold is closed, as shown in FIGS. 4–5. Pin 34 is then activated by cylinder 100 and linkage means 101 to engage clamp piston teeth 30 with tiebar teeth 28. High pressure oil is then provided to the clamp piston cylinder 46 causing the clamp pistons to clamp the mold. After molding, high pressure oil is provided to the mold break cylinder 48 causing clamp piston 32 to act on the back side of tiebar teeth 28 and urge the mold open. After a short stroke, clamp piston 32 is de-energized and pin 34 actuated by cylinder 100 and linkage means 101 causes the clamp piston to rotate to disengage clamp piston teeth 30 from tiebar teeth 28 so that stroke cylinder 22 can open the mold.

Figure 7:
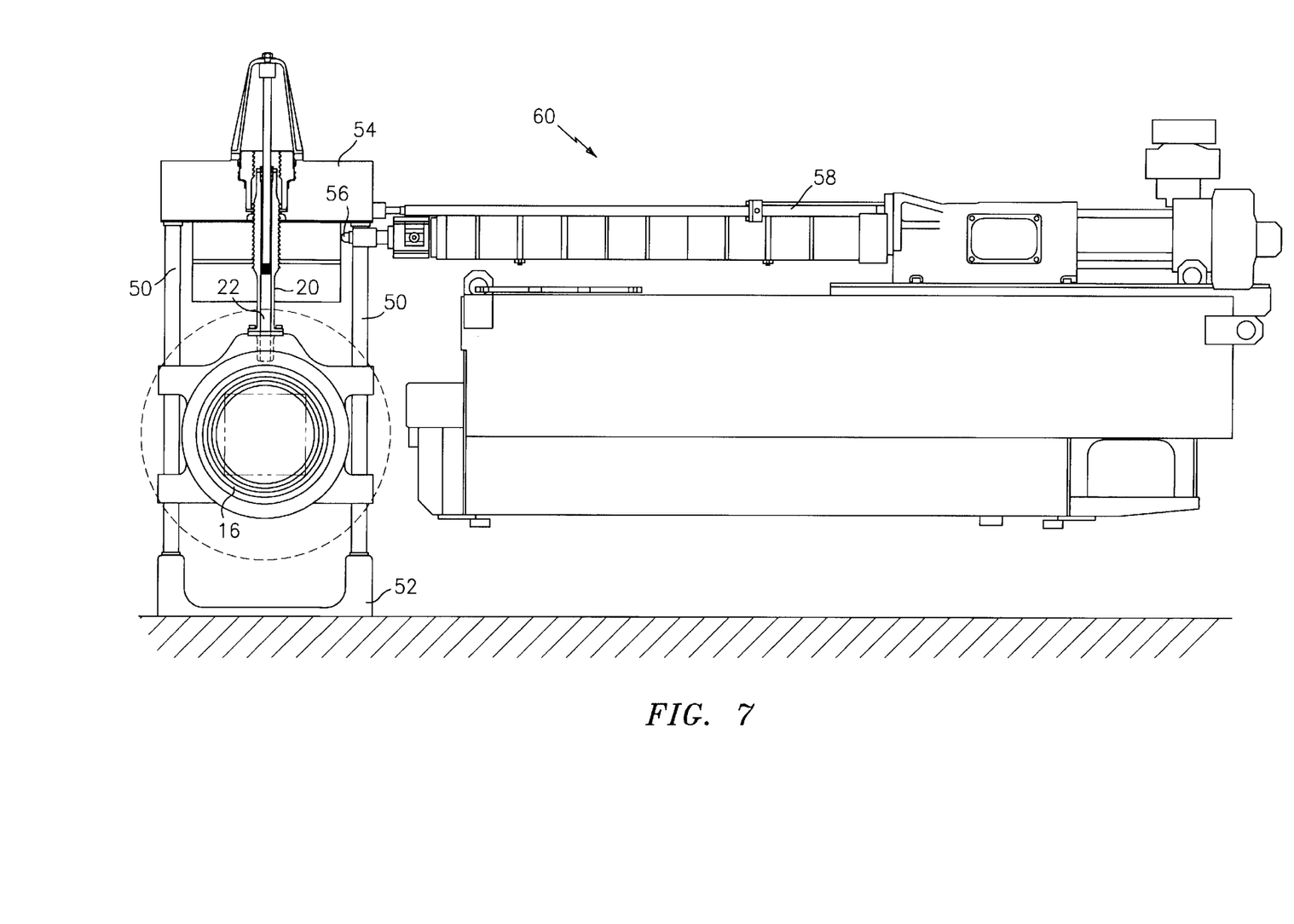
FIG. 7 is a side elevational view of an additional embodiment of the present invention showing a vertical clamp arrangement.
Figure 8:
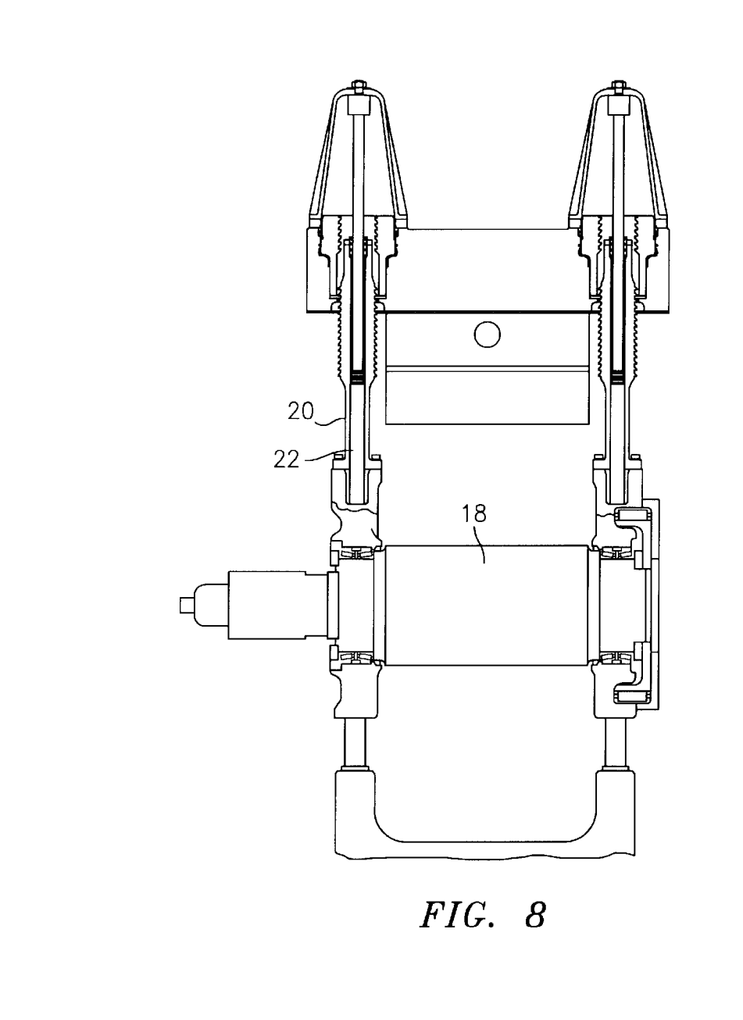
FIG. 8 is an end elevational view of the embodiment of FIG. 7.

FIGS. 7 and 8 show a second embodiment of the present invention. In the embodiment of FIGS. 7 and 8, the clamp units and tiebars are vertically oriented with respect to the injection unit. In this configuration, the turret block 16 and carrier assembly 18 moves vertically along four guide rods 50 (two shown in FIG. 7) that connect base 52 to stationary platen 54. In the mold closed position, the injection nozzle 56 is aligned with the infeeding port of the hot runner assembly (not shown). Cylinders 58 cause the injection unit 60 to move toward or away from the mold to seal the nozzle against the infeeding port as required. Tiebar 20 and stroke cylinder 22 operate as in the embodiment of FIGS. 1–6.

Figure 3:
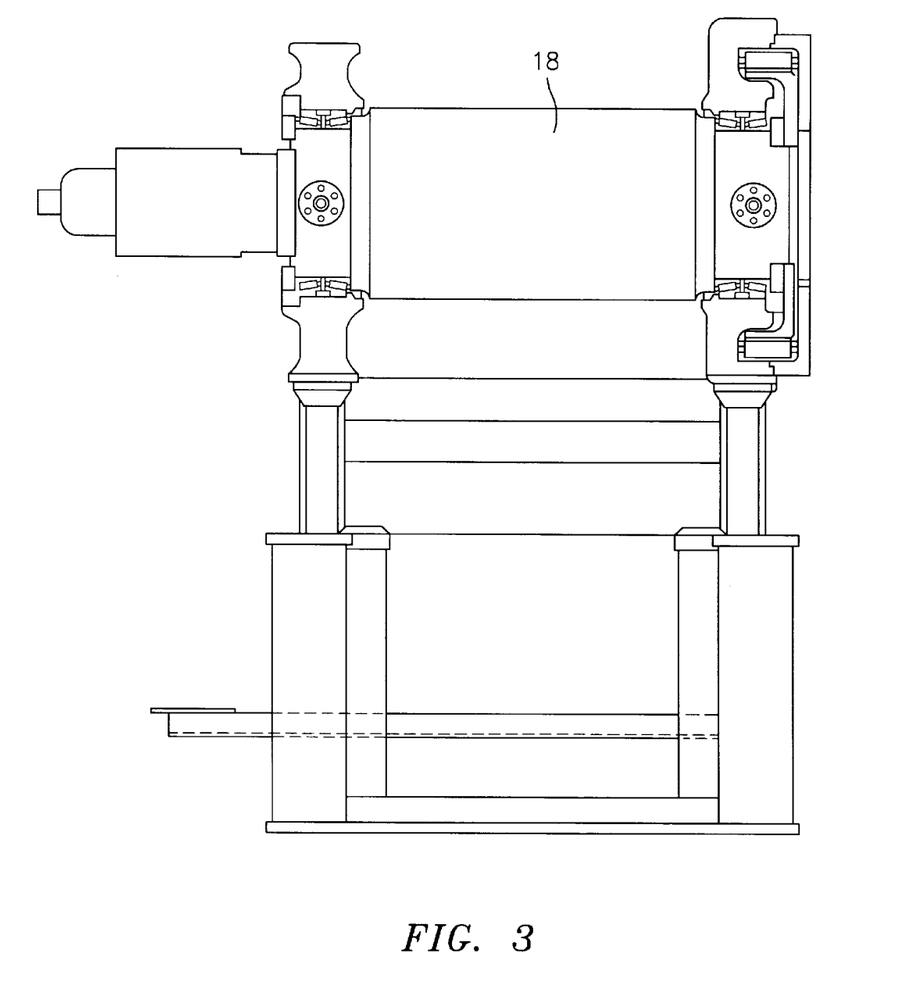
FIG. 3 is a sectional view of the turret block of FIG. 1.
Figure 3A:
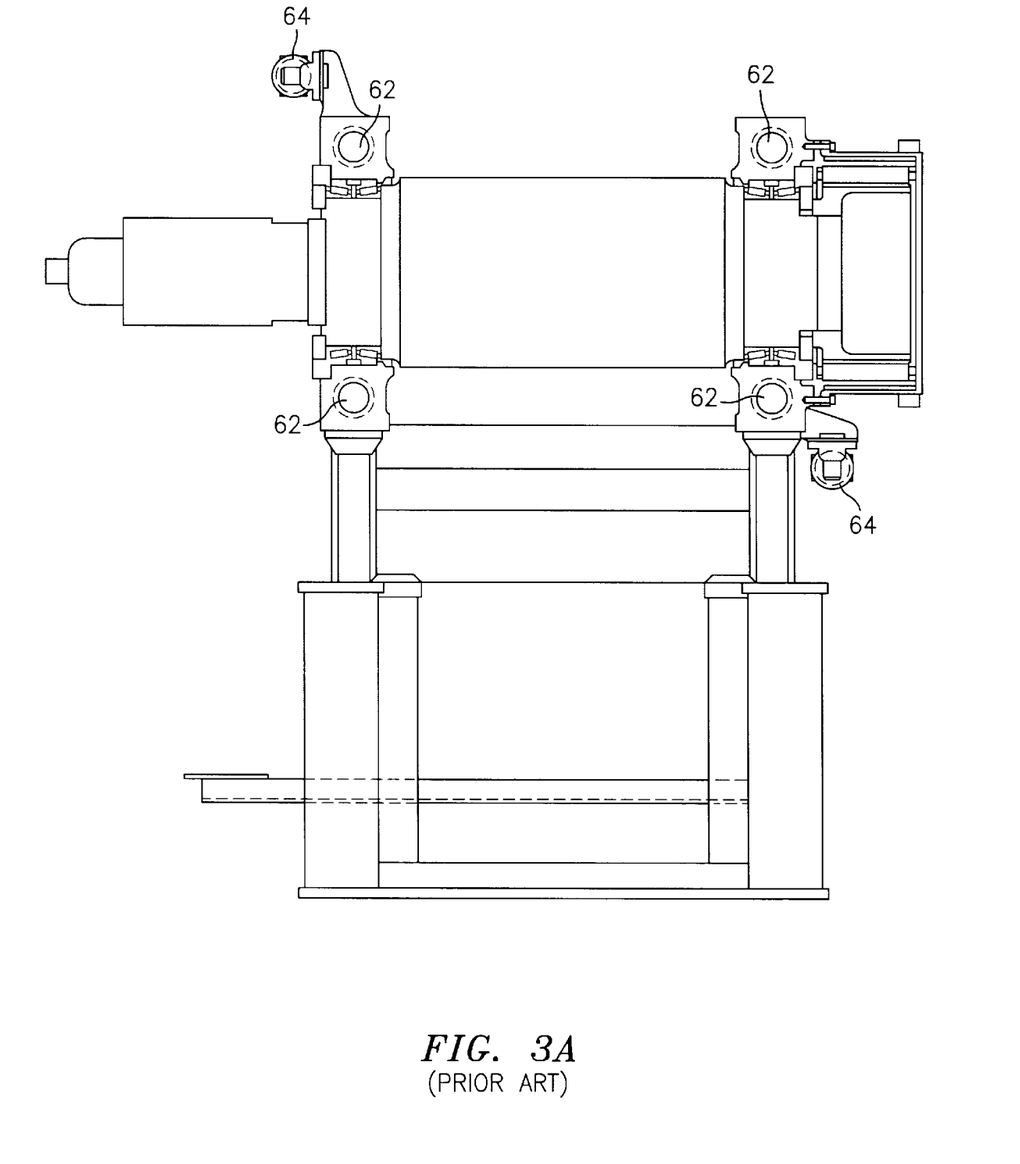
FIG. 3A is a comparative sectional view similar to FIG. 3 showing a prior art construction.

The advantages of the two tiebar designs shown herein is that clamping forces acting through the tiebars are applied to turret carriers 18 at the centerline of the pinion/bearings of the turret, thereby eliminating any risk of deflection of the carriers that can happen in a four tiebar configuration, compare the sectional view of FIG. 3 of the present invention, with the sectional view of FIG. 3A which shows four (4) tiebars 62 and two stroke cylinders 64. The elimination of this bending risk allows the carrier structure to be made lighter thereby permitting faster accelerations of its mass for fast acting molding cycles. This is an ideal arrangement for smaller size clamps in the range of 10 to 200 tons.

An additional advantage of the present invention is the reduction in parts used to build this configuration as compared to the four tiebar construction. Thus, the present invention obtains reduced cost and reduced complexity, which is highly advantageous. In addition, there is a reduction in the number of cylinders, hoses, valves and other hydraulic components, which results in less complexity and less places for leaks to occur.

The present invention can readily and advantageously be employed in for example a four tiebar version by using the design of the present invention of a combined tiebar/clamp/stroke cylinder in a four tiebar version. By incorporating the stroke cylinder inside the tiebar, which also engages the clamping means, this eliminates the need for separate stroke cylinders as shown in FIG. 3A. This alone provides cost savings, more efficient use of space, and simplification of hydraulic piping, seals, etc. to reduce the possibility of leaks. Thus, the present invention is not limited to use with a rotatable turret means but can be advantageously used in a wide variety of injection molding machines such as that shown in U.S. patent application Ser. No. 08/582,434 referred to above.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A tiebar construction for an injection molding machine, comprising: a stationary platen; a movable platen which is movable with respect to the stationary platen from a closed position in clamping engagement with the stationary platen to an open position spaced from the stationary platen; at least two hollow tiebars connecting the stationary platen to the movable platen; a stroke cylinder including a stroke cylinder rod within at least two of said tiebars operative to move the platens from an open to closed position and from a closed to open position; wherein said at least two tiebars are fixed at one end only to one platen and said stroke cylinder rods are fixed at one end only to the other platen; releasable clamping means to clamp the platens together in the closed position; and engagement means carried by at least two of said tiebars to engage said clamping means.

2. The tiebar construction according to claim 1, wherein the movable platen is a rotatable turret means.

3. The tiebar construction according to claim 2, wherein said rotatable turret means rotates on a central axis of rotation for rotating at least two movable mold halves thereof into alignment with a mold half carried on said stationary platen.

4. The tiebar construction according to claim 1, wherein said at least two tiebars are fixed at one end only to the movable platen, and said stroke cylinder rods are fixed at one end only to the stationary platen.

5. The tiebar construction according to claim 4, wherein said stroke cylinder rods have a piston end, and including pressure means acting on said piston ends to extend said stroke cylinder rods operative to move the movable platen away from the stationary platen.

6. The tiebar construction according to claim 5, wherein said stroke cylinder has a rod side opposed to said piston end of the stroke cylinder rod, and including pressure means acting on said rod side operative to retract the stroke cylinder rod and move the movable platen towards said stationary platen.

7. The tiebar construction according to claim 1, including a rotary clamp piston contained in the stationary platen.

8. The tiebar construction according to claim 7, wherein at least two of said tiebars include external teeth that engage internal teeth of said clamp piston.

9. The tiebar construction according to claim 8, including an extended amount of tiebar teeth to permit engagement with the clamp piston teeth in a variety of shutheight positions.

10. The tiebar construction according to claim 1, wherein the tiebars are horizontally oriented.

11. The tiebar construction according to claim 9, wherein the tiebars are vertically oriented.

12. The tiebar construction according to claim 1, wherein said at least two tiebars include both stroke and clamping functions.

13. The tiebar construction according to claim 1, wherein said at least two tiebars and stroke cylinder rods are relatively telescoping, and wherein said at least two tiebars engage and disengage said clamping means.

14. The tiebar construction according to claim 1, wherein the clamping means includes a clamp piston, and wherein the means carried by at least two tiebars is an engagement means, including a mold break cylinder acting on the clamp piston to first urge the platens apart, and means to disengage the engagement means and clamping means so that the stroke cylinder can move the platens from a closed to open position.

15. The tiebar construction according to claim 8, wherein the tiebar teeth have a back and front side, wherein the mold break cylinder causes the clamping means to act on the back side of the tiebar teeth to first urge the platens apart.

16. An injection molding machine including: a stationary platen; a movable platen which is movable with respect to the stationary platen from a closed position in clamping engagement with the stationary platen to an open position spaced from the stationary platen; at least two hollow tiebars connecting the stationary platen to the movable platen; a stroke cylinder including a stroke cylinder rod within at least two of said tiebars operative to move the platens from an open to closed position and from a closed to open position; wherein said at least two tiebars are fixed at one end only to one platen and said stroke cylinder rods are fixed at one end only to the other platen; releasable clamping means to clamp the platens together in the closed position; and engagement means carried by at least two of said tiebars to engage said clamping means.

17. The injection molding machine according to claim 16, wherein the movable platen is a rotatable turret means.

18. The injection molding machine according to claim 17, wherein said rotatable turret means rotates on a central axis of rotation for rotating at least two movable mold halves thereof into alignment with a mold half carried on said stationary platen.

19. The injection molding machine according to claim 16, wherein said at least two tiebars are fixed at one end only to the movable platen, and said stroke cylinder rods are fixed at one end only to the stationary platen.

20. The injection molding machine according to claim 19, wherein said stroke cylinder rods have a piston end, and including pressure means acting on said piston ends to extend said stroke cylinder rods operative to move the movable platen away from the stationary platen.

21. The injection molding machine according to claim 20, wherein said stroke cylinder has a rod side opposed to said piston end of the stroke cylinder rod, and including pressure means acting on said rod side operative to retract the stroke cylinder rod and move the movable platen towards said stationary platen.

22. The injection molding machine according to claim 16, including a rotary clamp piston contained in the stationary platen.

23. The injection molding machine according to claim 22, wherein at least two of said tiebars include external teeth that engage internal teeth of said clamp piston.

24. The injection molding machine according to claim 23, including an extended amount of tiebar teeth to permit engagement with the clamp piston teeth in a variety of shutheight positions.

25. The injection molding machine according to claim 24, wherein the tiebars are horizontally oriented.

26. The injection molding machine according to claim 25, wherein the tiebars are vertically oriented.

27. The injection molding machine according to claim 16, wherein said at least two tiebars include both stroke and clamping functions.

28. The injection molding machine according to claim 16, wherein said at least two tiebars and stroke cylinder rods are relatively telescoping, and wherein said at least two tiebars engage and disengage said clamping means.

29. The injection molding machine according to claim 16, wherein the clamping means includes a clamp piston, and wherein the means carried by at least two tiebars is an engagement means, including a mold break cylinder acting on the clamp piston to first urge the platens apart, and means to disengage the engagement means and clamping means so that the stroke cylinder can move the platens from a closed to open position.

30. The injection molding machine according to claim 24, wherein the tiebar teeth have a back and front side, wherein the mold break cylinder causes the clamping means to act on the back side of the tiebar teeth to first urge the platens apart.

* * * * *